United States Patent [19]

Takasu et al.

[11] Patent Number: 6,035,062
[45] Date of Patent: Mar. 7, 2000

[54] CHARACTER RECOGNITION METHOD AND APPARATUS

[75] Inventors: Eiji Takasu, Yokohama; Tsunekazu Arai, Tama; Hiroto Yoshii, Tokyo, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/703,799

[22] Filed: Aug. 28, 1996

[30] Foreign Application Priority Data

Aug. 29, 1995 [JP] Japan ................... 7-220147

[51] Int. Cl.7 .................................. G06K 9/00
[52] U.S. Cl. ................................... 382/187
[58] Field of Search ................... 382/187, 189, 382/227, 286

[56] References Cited

U.S. PATENT DOCUMENTS

| | | | |
|---|---|---|---|
| 5,267,327 | 11/1993 | Hirayama | 382/187 |
| 5,315,667 | 5/1994 | Fujisaki et al. | 382/187 |
| 5,502,461 | 3/1996 | Okamoto et al. | 382/187 |
| 5,666,438 | 9/1997 | Beernink et al. | 382/187 |
| 5,673,337 | 9/1997 | Gallo et al. | 382/187 |
| 5,710,832 | 1/1998 | Berman et al. | 382/189 |
| 5,787,202 | 7/1998 | Ueno | 382/227 |

*Primary Examiner*—Christopher S. Kelley
*Attorney, Agent, or Firm*—Fitzpatrick, Cella, Harper & Scinto

[57] ABSTRACT

A character registered in a user's dictionary by a user is outputted prior to other character in a character recognition process. To realize this operation, the character recognition apparatus comprises a user's dictionary (105) and a basic dictionary (103), and a user's unique handwritten character is registered in the user's dictionary (105). In addition, a priority order associated with the handwritten character is simultaneously designated to a priority designation section (109) and stored in a priority storing section (108). When character recognition operation is performed, the basic dictionary (103) and the user's dictionary (105) are utilized; and the recognition result from the basic dictionary and the recognition result from the user's dictionary are adjusted at a result adjusting section (107), by utilizing the priority obtained from the priority storing section (108). Those characters registered in the user's dictionary (105) are outputted prior to other characters in a subsequent recognition operation.

31 Claims, 10 Drawing Sheets

| CHARACTER CODE | RECOGNITION OPERATION VALUE |
|---|---|
| 0 × 2122 | 80 |
| 0 × 2123 | 60 |
| 0 × 2124 | 40 |
| ⋮ | ⋮ |

CHARACTER RECOGNITION METHOD AND APPARATUS

BACKGROUND OF THE INVENTION

Present invention relates to a character recognition method and apparatus for recognizing an inputted handwritten character by registering a user's unique handwriting and associated character code in a dictionary and utilizing the user's dictionary in addition to a built-in basic dictionary for character recognition.

In a conventional character recognition apparatus which is capable of registering a user's handwriting character into a recognition dictionary (user's dictionary), an inputted character pattern is recognized by utilizing a built-in basic dictionary and the user's dictionary.

In such recognition processing method, an n number of candidates of recognized character for an inputted unknown pattern are first obtained by utilizing a recognition dictionary called a basic dictionary, which is built in a recognition apparatus. Next, a user's dictionary created by the user is utilized for recognizing the unknown pattern and candidates of recognized characters are obtained.

As a result of the above process, a set of final recognized character candidates is generated by utilizing the n number ($n \geq 0$) of character codes obtained by matching with the basic dictionary, a recognition score thereof obtained by a recognition operation (generally obtained by operating a difference between an unknown pattern and a learned pattern), the k number ($k \geq 0$) of character codes obtained by matching with the user's dictionary, and a recognition score thereof obtained by the recognition operation. To obtain the set of final recognized character candidates, both recognition scores obtained by matching with each of the recognition dictionaries are compared and merged.

For registering a user's unique handwriting in the user's dictionary, the recognition apparatus comprises handwritten character registering means for storing the user's handwritten character and the associated character code in pairs.

However, in a character recognition apparatus such as that of the above conventional example which outputs a recognition result by utilizing the basic dictionary and the user's dictionary, a character is not always recognized as intended by a user although a user inputs a character that has been registered in the user's dictionary. This is due to the fact that it is almost impossible for a user to write a character having identical characteristics to the character registered in the dictionary. Moreover, if a registered character resembles another character in the basic dictionary or in the user's dictionary, an inputted character is not always matched correctly with the corresponding character in the user's dictionary; instead, the resembling character is outputted as a first candidate of the recognized character.

Meanwhile, if one of the registered characters is written frequently, the user's handwriting of the character is consistent. Therefore, the character is highly likely to be recognized correctly since it is written the same way as the registered character. However, for a character which is not written frequently, it is likely that the character is inputted differently than the registered handwritten character, therefore, a recognition result may vary depending on the type of registered character.

Accordingly, a satisfactory recognition result is difficult to obtain because of the foregoing problem.

SUMMARY OF THE INVENTION

The present invention has been made in consideration of the above situation, and has as its objective to provide a character recognition apparatus which is capable of outputting a character registered in the user's dictionary prior to other characters in a subsequent character recognition operation, thereby providing a satisfactory character recognition apparatus.

In order to attain the above objective, the present invention suggests a character recognition apparatus for recognizing handwritten characters having a user's dictionary and a basic dictionary, comprising handwritten character registering means for registering user's unique handwritten characters in the user's dictionary, priority designating means for designating a recognition priority, priority storing means for storing the priority designated by the priority designating means, and recognition result adjusting means for utilizing the basic dictionary and the user's dictionary for character recognition operation, and adjusting a recognition result obtained from the basic dictionary and a recognition result obtained from the user's dictionary by applying the recognition priority obtained by the priority storing means.

More specifically, for example, the designation of the recognition priority to the priority designation means is performed when a handwritten character to be registered by a user is recognized as resemblant to another character. Further, the designation of the recognition priority to the priority designation means is set for each character to be registered. Moreover, the designation of the recognition priority to the priority designation means is set for each character set (e.g., hiragana, alphabet or the like) to be registered.

Further, when a standard character pattern of a user's dictionary is included in recognized character candidates as a result of the recognition operation of a user's handwritten character, a specified process according to the priority is performed. Moreover, the designation of the recognition priority to the priority designation means enables a selection between an obligatory output mode in which a designated character is always outputted as a first candidate, and a normal output mode in which an order of candidates for the designated character is not changed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

[First Embodiment]

Figure 1:
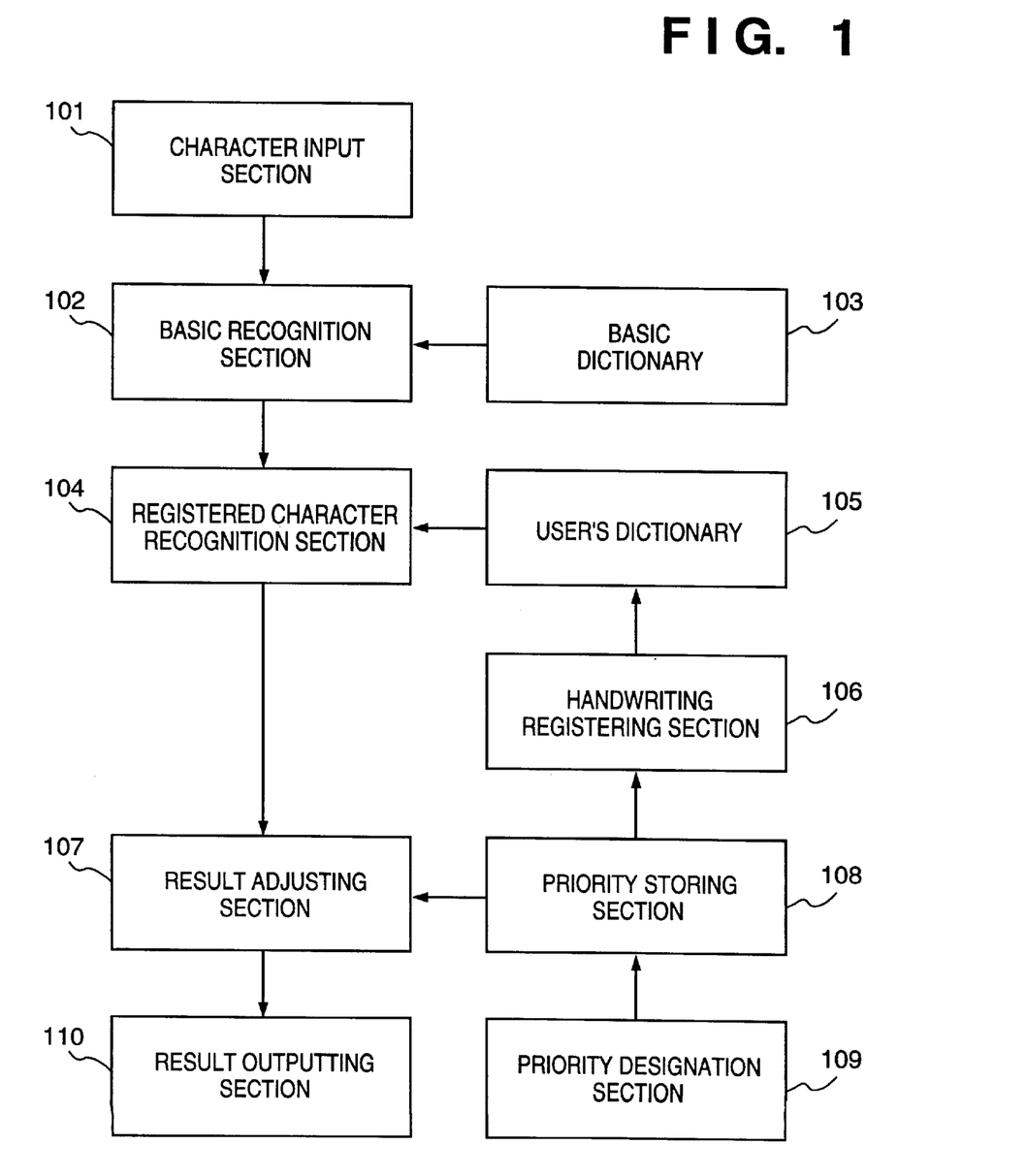
FIG. 1 is a block diagram showing a functional structure of a character recognition apparatus according to an embodiment of the present invention.

FIG. 1 shows a functional structure of a character recognition apparatus as a first embodiment of the present invention. In FIG. 1, reference numeral 101 denotes a character input section where inputted character data is obtained by a coordinate input apparatus such as a digitizer, and coordinates data indicative of coordinate points is mainly inputted. Reference numeral 102 denotes a basic recognition section where a characteristic of the character inputted from the character input section with coordinate points is extracted, a pattern matching process is performed by matching the characteristic with a standard pattern stored in a basic dictionary 103. Reference numeral 103 denotes the basic dictionary in which characteristics of standard character patterns and corresponding character codes are stored. Result of character recognition operation consists of a set of the n number (n≧0) of character codes and recognition operation values (recognition score) which were utilized for obtaining the character codes.

Reference numeral 104 denotes a user registered character recognition section, where the inputted character data utilized by the basic recognition section 102 is again utilized, a predetermined characteristic is extracted for recognition operation using a user's dictionary, and a pattern matching process is performed with a user's unique standard pattern stored in a user's dictionary 105. Herein, the k number (k≧0) of character codes and a recognition score for each of the character codes are generated as a result of the recognition operation utilizing the user's dictionary, similar to the process of the basic recognition section 102.

Reference numeral 105 denotes a user's dictionary where handwriting data which is unique to a user and character codes which correspond to the handwriting data are registered; 106, a handwritten character registering section where the user's unique handwriting data is registered in the user's dictionary 105. Note that the registering of user's unique standard pattern into the user's dictionary 105 is performed by the handwritten character registering section 106 where a handwritten character of a user and a character code corresponding to the handwritten character is stored in pairs in the user's dictionary 105. Generally this process is realized by an application using a graphical user interface (GUI).

Reference numeral 107 denotes a result adjusting section where the set of the n number of recognized character candidates obtained by the basic recognition section 102 and the set of the k number of recognized character candidates obtained by the registered character recognition section 104 are merged and a set of final recognized character candidates is generated; 108, a priority storing section where a designated priority is stored; 109, a priority designation section for designating a priority to prioritize a particular character candidate at the time of character recognition; and 110, a result output section for outputting a set of candidates obtained by the result adjusting section 107.

Figure 2:
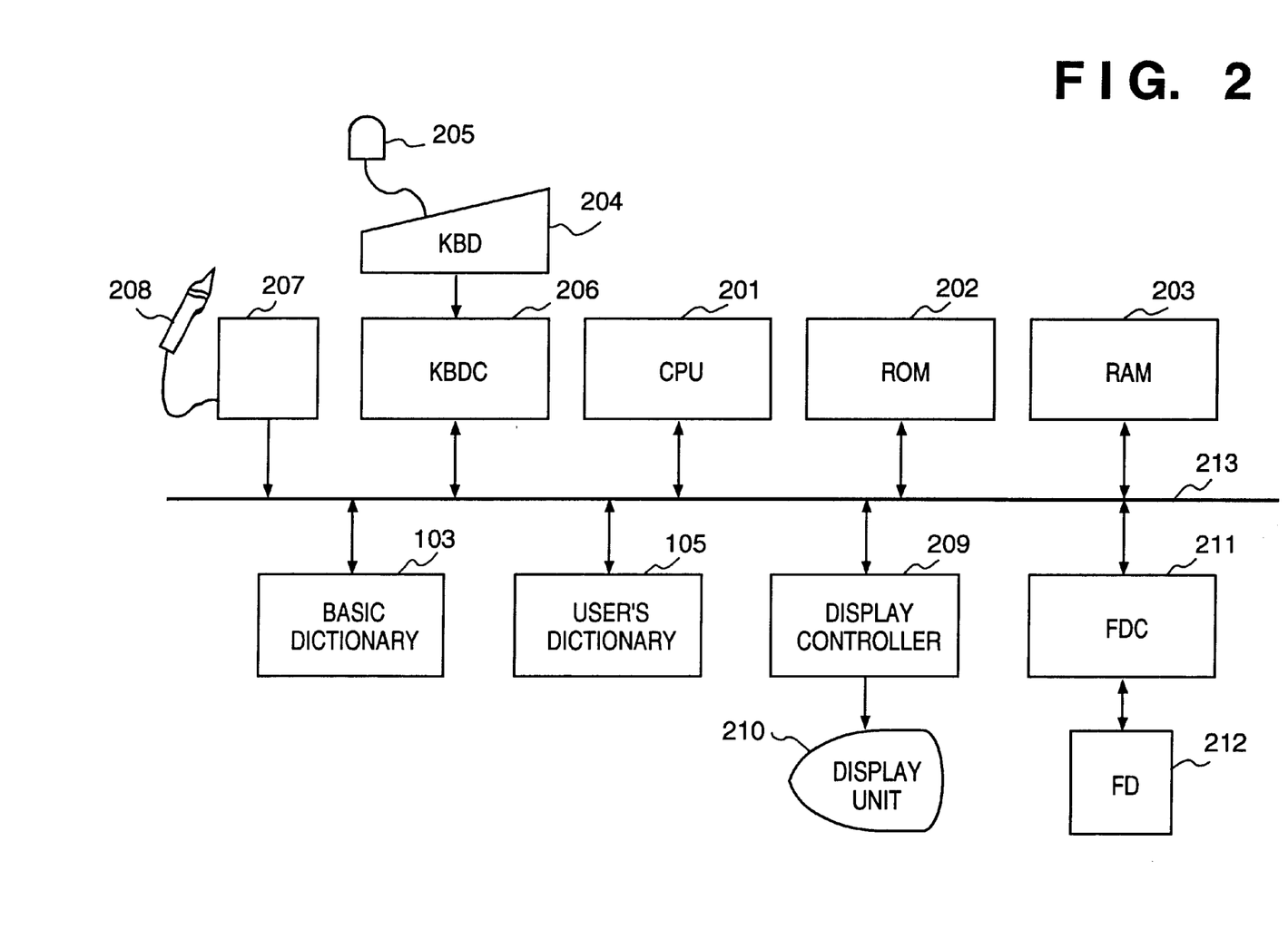
FIG. 2 is a block diagram showing a configuration of the character recognition apparatus according to the present embodiment.

A configuration of a character recognition apparatus having the above described function according to the first embodiment of the present invention is shown in FIG. 2.

In FIG. 2, reference numeral 201 denotes a CPU which controls an entire apparatus in accordance with a stored control program, data and the like; 202, a ROM for storing the control program for CPU 201 or various data and the like; and 203, a RAM which is utilized as a work area of the CPU 201 and stores inputted character patterns and the like. The above described basic dictionary 103 and the user's dictionary 105 can be stored in the RAM 203.

Reference numeral 204 denotes a keyboard; 205, a pointing device for inputting a position on a display screen or coordinates data or the like; 206, a controller for controlling the keyboard 204 and the pointing device 205; and 207, a coordinates input section consisting of a digitizer or the like. Data such as a character written by an input pen 208 or the like is inputted as inputted data in the coordinates input section 207.

Reference numeral 209 denotes a display controller for controlling a display unit 210; 210, a display unit such as a CRT or a liquid crystal display or the like; 211, a controller for controlling an interface such as a floppy disk, hard disk or the like; and 212, an external memory such as a floppy disk or hard disk.

The above described basic dictionary 103 and/or the user's dictionary 105 do not have to be entirely stored in the RAM 203, but may be stored in the external memory 212 and read out to a dictionary memory area in the RAM 203 as necessary. Alternatively, a dictionary may be stored solely in the external memory 212 and referred directly to the external memory 212. Note that reference numeral 213 denotes a system bus which connects each of the above described sections.

Next, the operation of the present embodiment having the foregoing configuration will be described in detail with reference to FIGS. 3 to 9.

Figure 3:
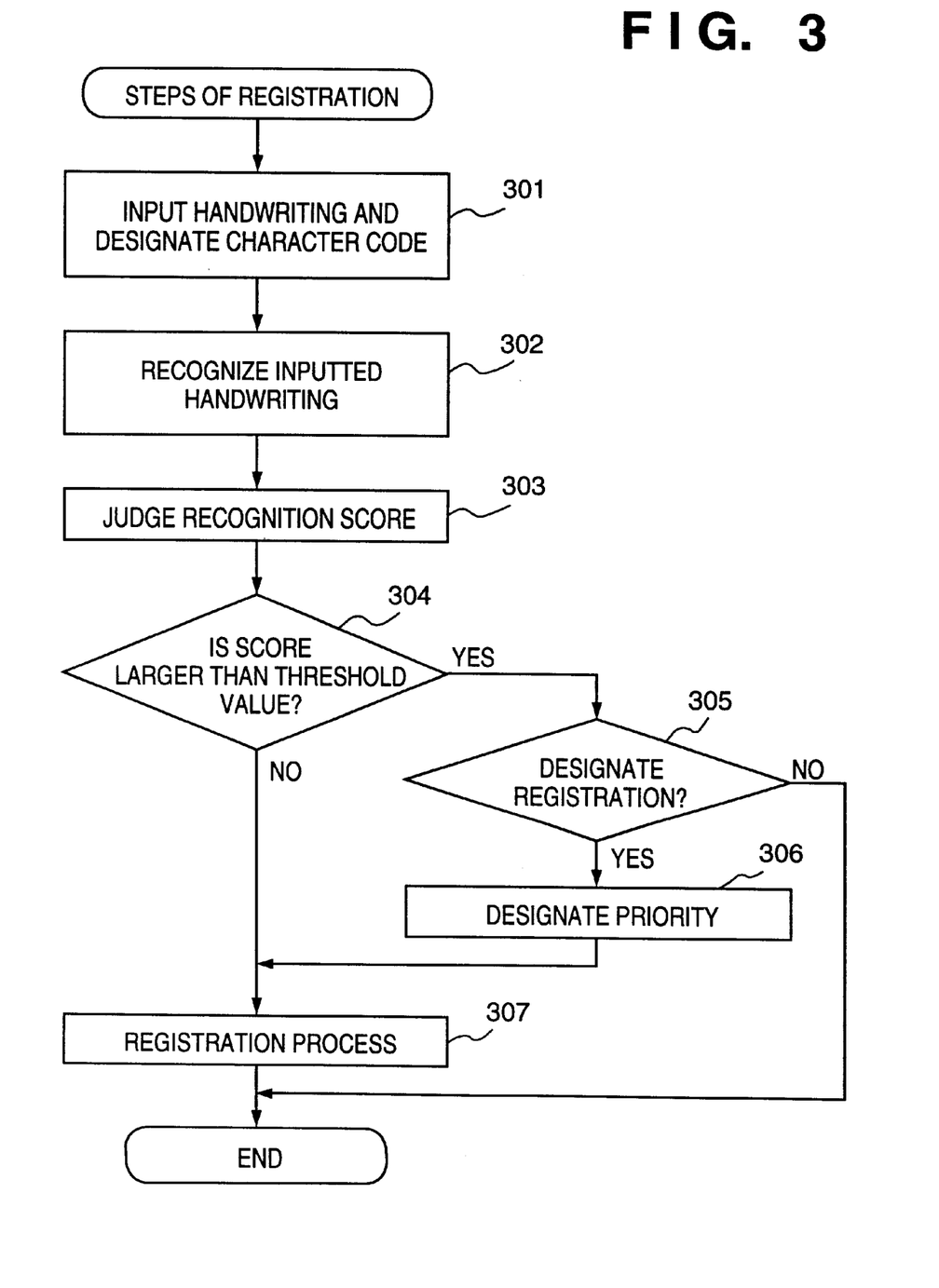
FIG. 3 is a flowchart showing a process of priority designation at the time of registering a handwritten character according to the present embodiment.

FIG. 3 is a flowchart showing the steps of registering a character by a user.

Figure 4:
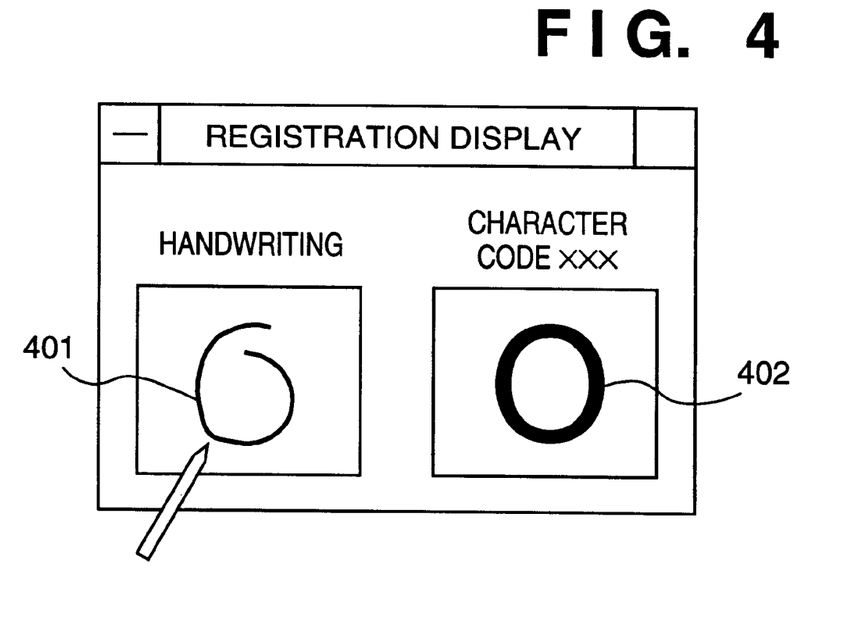
FIG. 4 is a screen view at the time of registering a handwriting according to the present embodiment.

First, a user inputs a handwriting character to be registered using the pen 208 in step 301 and designates the associated character code. The state of designation is shown in FIG. 4. In FIG. 4, the left side shows the inputted handwriting character 401 and the right side shows the corresponding character code and the corresponding character 402(0). More specifically, the character 401 shown in the left side indicates a handwriting pattern inputted by a user, and the character 402(0) shown in the right side indicates a standard character pattern (stored in a font memory in the ROM or the like) to be registered. In this example, a character code is inputted by e.g. a keyboard in order to display a standard character pattern. Alternatively, a character table can be displayed and a desired character can be selected, or a user may carefully input a character so that the character is recognizable. In either case, the operation performed in this step is to enable matching between a handwritten character in the user's normal hand and the character to be recognized.

Figure 5:
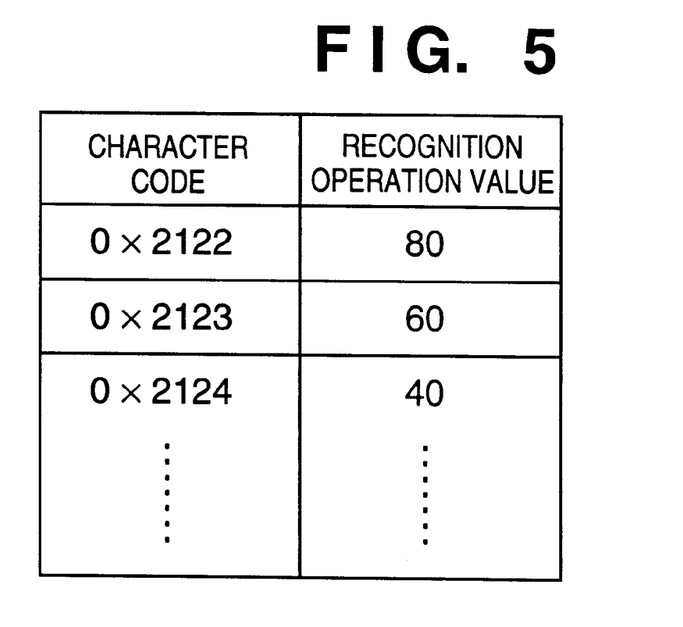
FIG. 5 is a table showing contents of character candidates as a result of recognition operation according to the present embodiment.

In the next step 302, characteristics of the handwriting inputted in step 301 are extracted utilizing a conventional technique and the handwritten character is recognized (character recognition). By the recognition performed in step 302, a plurality of character candidates are obtained. The contents of the character candidates include, for instance as shown in FIG. 5, character codes and corresponding recognition operation values (recognition score) obtained in the recognition process.

In step 303, certainty of the recognition result is judged by utilizing the recognition operation value. In the following step 304, whether or not a recognition operation value of a first character candidate of the recognition result, as a result of the judgment in step 303, is larger than a predetermined threshold value is determined. If the result is not larger than the predetermined threshold value, the processing proceeds to step 307, and the result is registered in the external memory 212. A process type for a character to be registered will be described later.

Meanwhile in step 304, if the recognition operation value is larger than the predetermined threshold value and the character code obtained in the recognition process is different from the desired character code to be registered, the processing proceeds to the designation process of a registration priority in step 305. The reason for performing a conditional determination process using a threshold value in step 304 is that, if a recognition operation value is large (in other words, the certainty of the recognition result is high), it implies that there is a very similar character exists in a recognition dictionary (e.g. basic dictionary or user's dictionary). Therefore, if the character is registered, there is a low probability for the registered character to be correctly recognized at the time of recognition operation.

In step 305, a window 601 in FIG. 6, which will be described later, is displayed in the display unit 210, and a designation of whether or not a user wishes to continue a registration operation is requested. Then, whether or not a registration operation is further designated is determined. If registration operation is not designated, the processing ends and registration of the inputted handwriting is abandoned.

Figure 6:
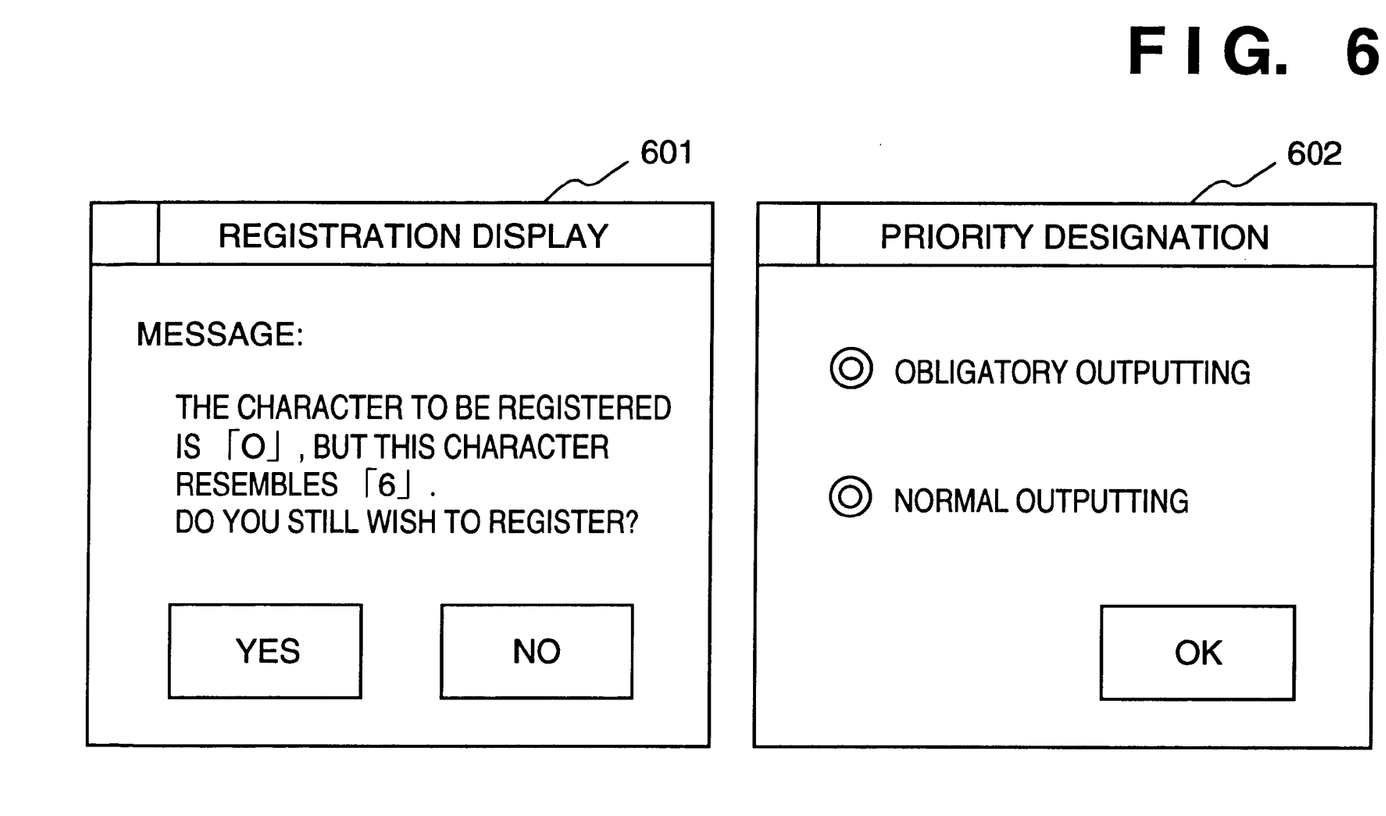
FIG. 6 is screen views at the time of designating a priority according to the present embodiment.

Meanwhile, if a user inputs a designation of further registration operation in the window 601 in step 305, the processing proceeds to step 306 where a window 602 in FIG. 6 is displayed in the display unit 210 to await for user's priority designation, and when a priority is designated, the handwriting is registered in the external memory 212 along with the priority designation in step 307.

Steps for designating a registration priority, following the step 305 will be described below in detail. Messages such as those shown in FIG. 6 are presented to a user via the display unit 210 by controlling operation of the CPU 201 and the processing proceeds. The message window 601 in FIG. 6 informs a user that the character to be registered is very similar to another character and inquires whether the registration operation is to be performed.

The character, determined to be very similar to the subject character, is indicated by a character code having a first order in the recognized character candidates obtained in steps 302 and 303. When a user designates registration in the window 601, the processing proceeds to step 306 where a message requesting a user to designate a priority is displayed as shown in the window 602 in FIG. 6.

Herein, when a character to be registered is inputted, an output level of a recognition result is displayed in two levels so that a user can select either of the levels. The contents of the levels will be described below. In "obligatory outputting," when a designated character is obtained as a recognized character candidate in a recognition process, the character is assigned a first priority in which the character is obligatory outputted first. In "normal outputting," no change is made to the priority order of character candidates and a recognition result is outputted in a normal process. Hereinafter, to simplify the description, the "obligatory outputting" will be referred to as a process A, and the "normal outputting" will be referred to as a process B.

Figure 7:
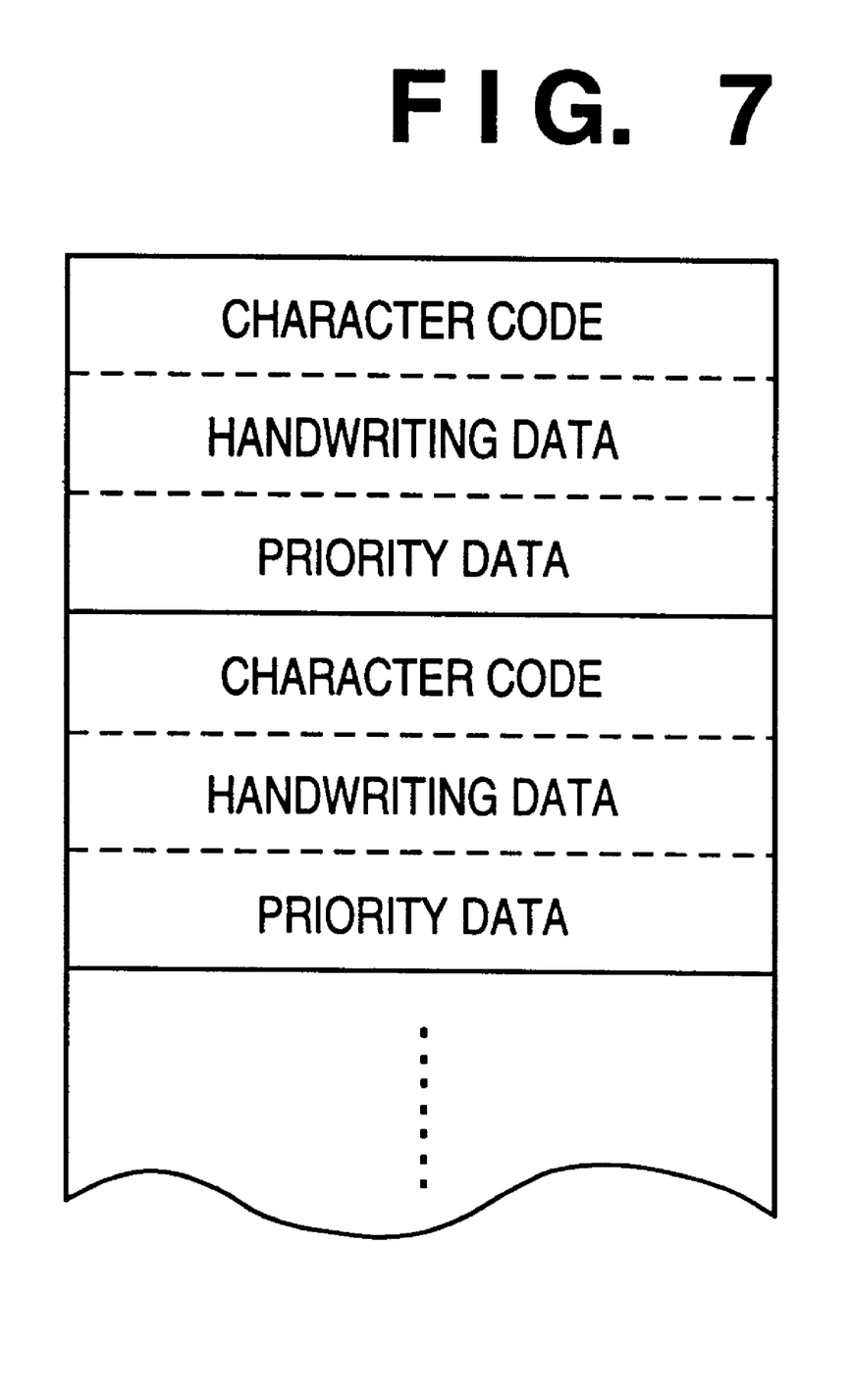
FIG. 7 is a diagram showing a configuration of a user's dictionary.

When a user selects a processing method in response to the window 602, handwriting data which is subjected to be registered, the character code, and a value indicating the selected processing method are set, and the character code, handwriting data and priority data are stored as one set of data in the user's dictionary in step 307 as shown in FIG. 7.

Next, the processing steps of recognition operation performed by utilizing the user's dictionary generated as set forth above, and steps of generating recognized character candidates will be described with reference to the flowchart in FIG. 8. At this stage, it is assumed that a recognition process utilizing the basic dictionary and a recognition process utilizing the user's dictionary have already been completed, and each of the recognized character candidates has been obtained.

In step 801, whether or not there is any results of the recognition process is determined. If there is no result of the recognition process, the processing proceeds to step 807 and outputs to inform a user that there is no recognized character candidate.

Meanwhile, if there is a result of the recognition process, the processing proceeds to step 802 where recognized character candidates obtained in the recognition process using the basic dictionary and recognized character candidates obtained in the recognition process using the user's dictionary are merged. The process of merging is described hereinafter with reference to FIG. 9. A recognition operation value of the recognition result using the basic dictionary (901) and a recognition operation value of the recognition result using the user's dictionary (902) are compared and sorted in the order of higher operation value and combined (903).

Next, in step 803, a process type for a first candidate in the recognized character candidates obtained from the user's dictionary is searched from the merged recognized character candidates. In step 804, the process type is determined. Taking the chart 903 in FIG. 9 which is merged in step 802 as an example, the character "P" is a first character candidate, and indicates the process type A.

Since the process type A indicates an obligatory process in the above example, the processing proceeds to step 805 where the character is prioritized as a first candidate, and priority orders for other characters of which priority orders need to be changed are incremented, and the orders of character candidates are rearranged in step 806. For example, in step 802, if a first candidate as a result of the recognition process utilizing the user's dictionary stands fourth in the merged result of character candidates, those characters ranking from the first to the third in the merged character candidates are lowered to the second to the fourth, respectively, and those character candidates ranking lower than the fourth are not changed. After the above process is completed, recognized character candidates are finally outputted in step 807.

Meanwhile, if the process type of the first character candidate as the result of the recognition process utilizing the user's dictionary indicates the process B (normal process), the processing proceeds to step 807 without any changes in the priority.

Figure 9:
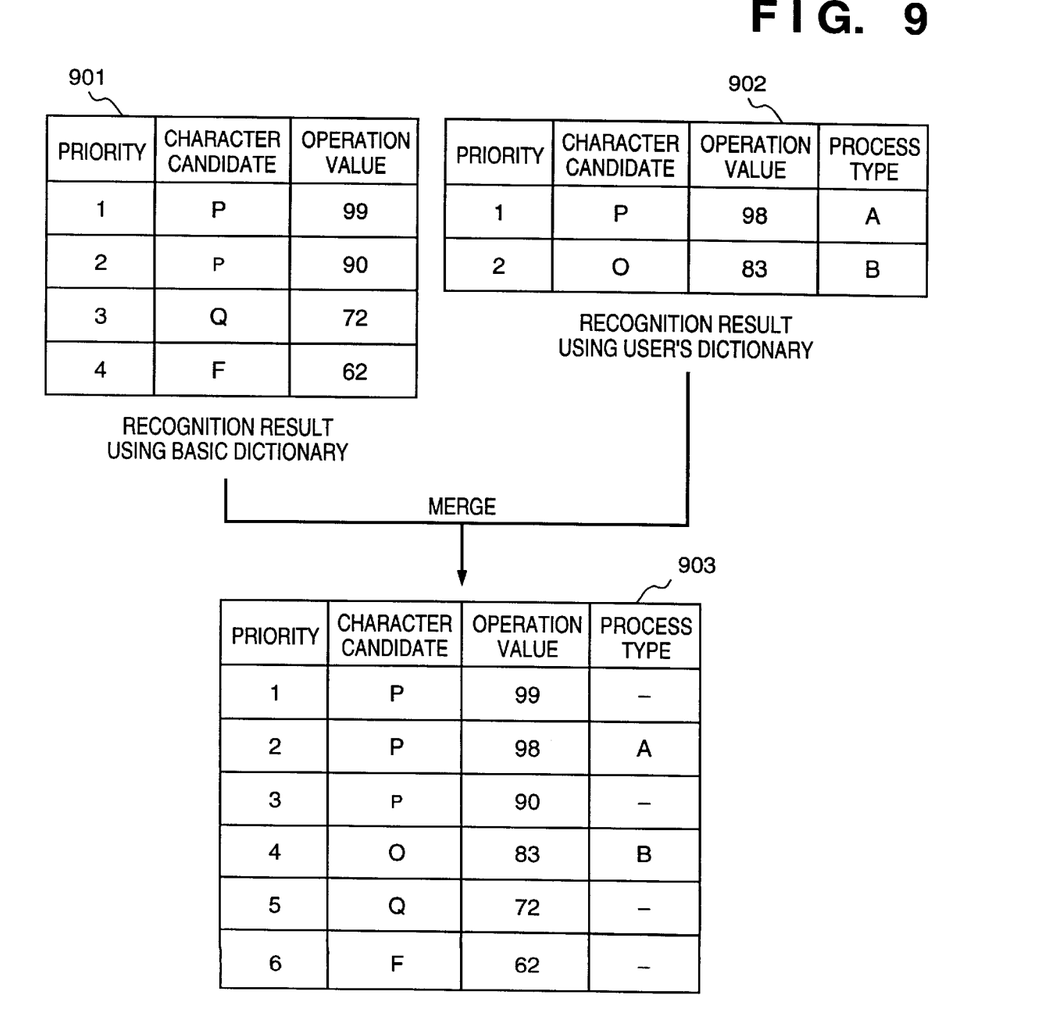
FIG. 9 is tables showing how a recognition result obtained from a basic dictionary is merged with a recognition result obtained from a user's dictionary.

Note that the recognized character candidates (e.g. 901) obtained from the basic dictionary in the above described example and the recognized character candidates (e.g. 902) obtained from the user's dictionary are the characters having an operation value more than a predetermined threshold value. The threshold value depends upon a recognition algorithm, and is a value suitable for a recognized character candidate. It is well known that the value can be obtained by the conventional experimentation; therefore, detailed description thereof will be omitted.

According to the present embodiment, the priority order of character candidates is stored in the user's dictionary as a process content. It is also possible to store a code in a file or the like, indicative of a process content as associated data of a registered character.

[Second Embodiment]

In the foregoing first embodiment, the priority of outputting recognition results is designated for each of the characters to be registered by a user. However the present invention is not limited to this example. The priority orders can be designated for each of the character sets. In the following second embodiment, a technique where priority orders are designated for each of the character sets instead of setting the order for every character, will be described.

Figure 10:
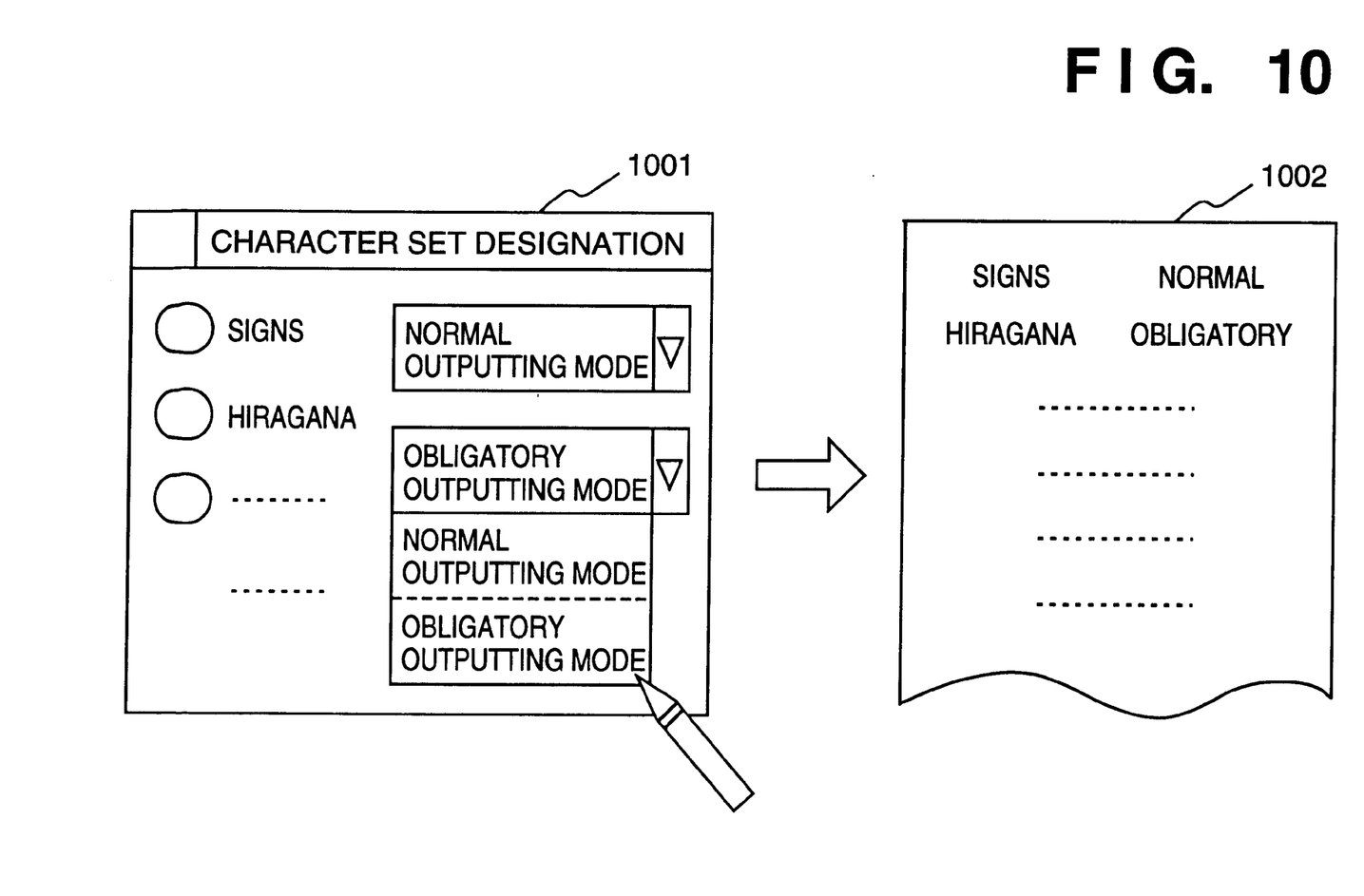
FIG. 10 is an input screen view for designating a priority for each character set, and a view showing contents of a priority description file, according to a second embodiment of the present invention.

In the second embodiment, on the display unit 210, a designation menu for each of the character sets as shown in FIG. 10 substitutes the above described display shown in FIG. 6. A user designates the priority for each character set in advance, referring to the menu in FIG. 10.

The priority designation means starts an application which applies a GUI such as a window 1001 and designates a priority for each character set. When the priority designation is completed, the designation result is registered in the external memory 212 in the character recognition apparatus. An example of the registration is shown in reference numeral 1002, on the right side of FIG. 10. This example shows a setting where the character set "hiragana" is set as the "obligatory process" mode. It is also possible to add alphabets or numbers as character sets.

When the priority designation is completed, the data is stored in the external memory 212 in the character recognition apparatus as a priority description file such as the designation 1002. The priority designation operation can be performed at any time and the priority file can be updated any time.

Figure 11:
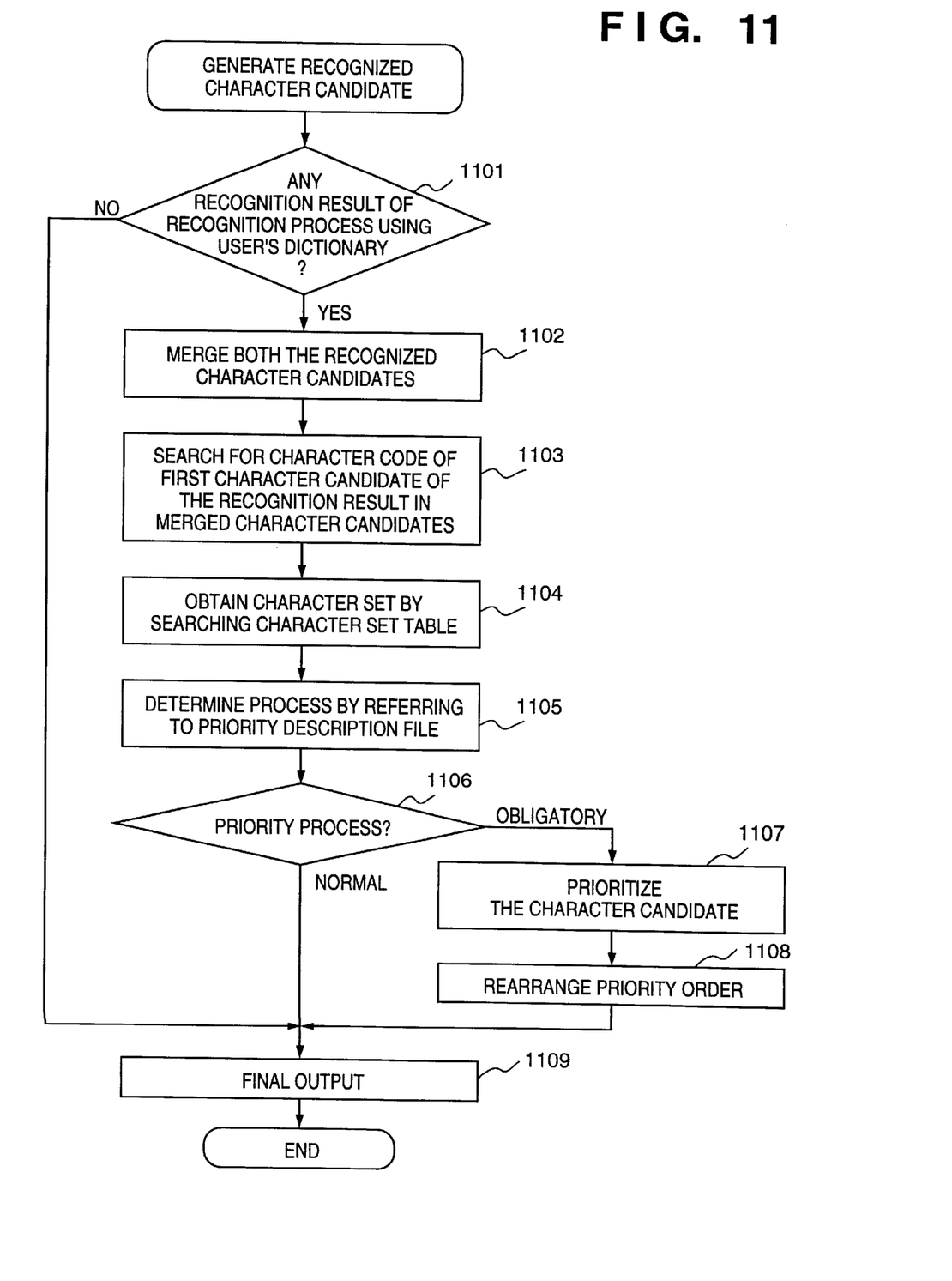
FIG. 11 is a flowchart showing a process of obtaining recognized character candidates according to the second embodiment.

Next, the recognition process utilizing the priority designation file according to the second embodiment will be described with reference to FIG. 11. The process in FIG. 11 is performed in almost the same manner as those steps shown in FIG. 8 except the steps 802 and 803 in FIG. 8. In the first embodiment, the merging process of the recognized character candidates using the basic dictionary and recognized character candidates using the user's dictionary has been described with reference to FIG. 9. Since the second embodiment is not related to a process type for each of the character in the user's dictionary, the column "process type" in FIG. 9 is unnecessary.

Figure 8:
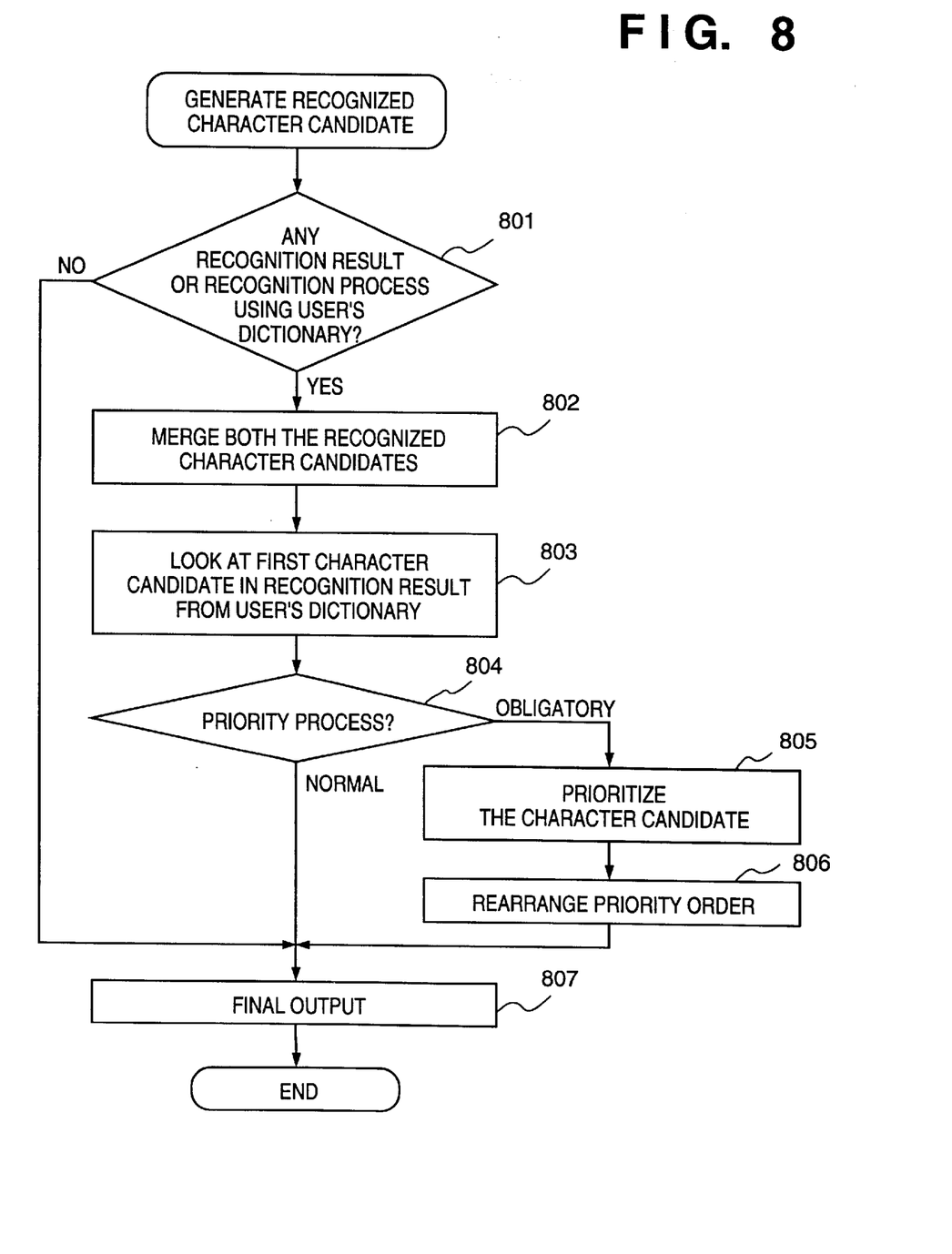
FIG. 8 is a flowchart showing the process of obtaining recognized character candidates according to the present embodiment.

Steps 1101 and 1102 in FIG. 11 are identical to the steps 801 and 802 in FIG. 8 respectively. Note that it is necessary to make clear the difference between the character candidates obtained from the recognition result using the user's dictionary and the character candidates obtained from the recognition result using the basic dictionary after the merging operation, by using a flag or the like.

In step 1103, a character code, which is prioritized as a first candidate in the recognition result using the user's dictionary, is searched from the recognized character candidates which are set as a first candidate in the recognition result using the user's dictionary. A character set of the character code is distinguished by utilizing a table or the like in step 1104. In step 1105, a column for character sets corresponding to the priority description file in the above described step 1002 is searched and a process content is decided. For example, suppose that the content of the priority description file is such as that of the reference numeral 1002 in FIG. 10. If the character set is a hiragana, the process content is an obligatory outputting.

The subsequent steps 1106 to 1109 are identical to the steps 804 to 807 in FIG. 8 in the foregoing first embodiment respectively. Therefore, detailed descriptions thereof will be omitted.

In the second embodiment set forth above, the same effects of the operation as the first embodiment can be achieved.

As has been described above, in the recognition method where an inputted unknown pattern is recognized and encodes the recognized character, a character which is written and registered by a user in a user's dictionary can be outputted as a first candidate of a recognition operation result, even when another character is outputted as a recognized character prior to the user's intended character. Compared to a case where a same character is registered for plural times in order to improve accuracy of character recognition, according to the present embodiment, the size of the dictionary can be kept small. Accordingly, a character desired by a user can be effectively outputted. Further according to the second embodiment, a priority can be designated for each character set. Therefore, cumbersome operation to designate a character set for each of the registered character is eliminated, and a character which is relatively frequently used, such as hiragana, can be outputted with priority, thereby improving accuracy in recognition operation.

The present invention can be applied to a system constituted by a plurality of devices or to an apparatus comprising a single device. Furthermore, the invention is applicable also to a case where the invention is embodied by supplying a program to a system or apparatus. In this case, a storage medium, storing a program according to the invention constitutes the invention. The system or apparatus installed with the program read from the medium realizes the functions according to the invention.

Note that in the first and the second embodiments, if more than two prioritized character codes exist in plural character codes which are recognized as character candidates, a character code having a larger recognition operation value is determined as the character code of the first candidate of the recognized character.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the aforementioned functions according to the invention, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (Operating System) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. A character recognition apparatus for recognizing characters by using a dictionary, comprising:

character input means for inputting a character to be registered in the dictionary;

character recognition means for recognizing the input character by using the dictionary and obtaining a candidate character and a recognition score of the candidate character;

judgment means for judging the obtained recognition score;

determination means for determining, on the basis of the judgment by said judgment means, whether or not to proceed to a user designation of a priority for recognition of the input character; and registering means, if the priority is designated by the user, for registering the input character along with the designated priority to the dictionary so that the designated priority is used when the character is obtained as one of candidate characters in a character input mode.

2. A memory medium storing computer-executable process steps for recognizing characters by using a dictionary, the process comprising the steps of:

inputting a character to be registered in the dictionary;

recognizing the input character by using the dictionary and obtaining a candidate character and a recognition score of the candidate character;

judging the obtained recognition score;

determining, on the basis of the judgment by said judgment step, whether or not to proceed to a user designation of a priority for recognition of the input character; and registering the input character, if the priority is designated by the user, along with the designated priority to the dictionary so that the designated priority is used when the character is obtained as one of candidate characters in a character input mode.

3. The character recognition apparatus according to claim 1, wherein the designation of the priority is set for each character to be registered.

4. The character recognition apparatus according to claim 1, wherein the designation of the priority is set for each character set to be registered.

5. The character recognition apparatus according to claim 1, wherein the designation of the priority enables a selection between an obligatory output mode in which a designated character is always outputted as a first candidate, and a normal output mode in which an order of candidates for the designated character is not changed.

6. A character recognition method for recognizing an inputted character in a character recognition apparatus where unique handwritten characters and associated character codes are registered in a dictionary and where the dictionary is utilized at the time of character recognition operation, comprising the steps of:

inputting a character to be registered in the dictionary;

recognizing the input character by using the dictionary and obtaining a candidate character and a recognition score of the candidate character;

judging the obtained recognition score;

determining, on the basis of the judgment by said judgment step, whether or not to proceed to a user designation of a priority for recognition of the input character; and registering the input character, if the priority is designated by the user, along with the designated priority to the dictionary so that the designated priority is used when the character is obtained as one of candidate characters in a character input mode.

7. The character recognition method according to claim 6, wherein the designation of the priority is set for each character to be registered.

8. The character recognition method according to claim 6, wherein the designation of the priority is set for each character set to be registered.

9. The character recognition method according to claim 6, wherein the designation of the priority enables a selection between an obligatory output mode in which a designated character is always outputted as a first candidate, and a normal output mode in which an order of candidates for the designated character is not changed.

10. The character recognition apparatus according to claim 1, wherein said judgment means judges whether or not the input character is resemblant to another character.

11. The character recognition apparatus according to claim 1, wherein said judgment means judges on the basis of comparison the score of the candidate character with a predetermined threshold.

12. The character recognition apparatus according to claim 1, wherein said judgment means judges whether or not the input character is resemblant to another character registered in the dictionary.

13. The character recognition apparatus according to claim 1, wherein said registering means registers the input character along the predetermined information in a case where said determination means determines that the priority for recognition of the input character is not designated by the user.

14. The character recognition apparatus according to claim 1, further comprising:

discrimination means for discriminating whether or not there is a character, having a priority registered in said dictionary, in candidate characters obtained by said character recognition means;

sort means for sorting said candidate characters when said discrimination means discriminates that the character, having a priority registered in said dictionary.

15. The character recognition apparatus according to claim 1, wherein said character recognition means recognizing a character by using a dictionary in which a priority of a character is registered.

16. The character recognition apparatus according to claim 1, wherein designation of a priority for recognition is made by using a window-style user interface.

17. The character recognition apparatus according to claim 1, wherein said character input by said input means is a handwritten character.

18. The character recognition apparatus according to claim 1, wherein said dictionary includes a basic dictionary and a user's dictionary.

19. The character recognition apparatus according to claim 1, wherein said character is input by a tablet.

20. The character recognition apparatus according to claim 1, wherein said character is input by a digitizer.

21. The character recognition method according to claim 6, wherein said judgment step judges whether or not the input character is resemblant to another character.

22. The character recognition method according to claim 6, wherein said judgment step judges on the basis of comparison the score of the candidate character with a predetermined threshold.

23. The character recognition method according to claim 6, wherein said judgment step judges whether or not the input character is resemblant to another character registered in the dictionary.

24. The character recognition method according to claim 6, wherein said registering step registers the input character along the predetermined information in a case where said determination step determines that the priority for recognition of the input character is not designated by the user.

25. The character recognition method according to claim 6, further comprising the steps of:
   discriminating whether or not there is a character, having a priority registered in said dictionary, in candidate characters obtained by said character recognition step;
   sorting said candidate characters when said discrimination step discriminates that the character, having a priority registered in said dictionary.

26. The character recognition method according to claim 6, wherein said character recognition step recognizing a character by using a dictionary in which a priority of a character is registered.

27. The character recognition method according to claim 6, wherein designation of a priority for recognition is made by using a window-style user interface.

28. The character recognition method according to claim 6, wherein said character input by said input step is a handwritten character.

29. The character recognition method according to claim 6, wherein said dictionary includes a basic dictionary and a user's dictionary.

30. The character recognition method according to claim 6, wherein said character is input by a tablet.

31. The character recognition method according to claim 6, wherein said character is input by a digitizer.

* * * * *